July 4, 1939.  B. C. HASKIN  2,164,651
MINIATURE SHIP
Filed Jan. 25, 1938  3 Sheets-Sheet 1
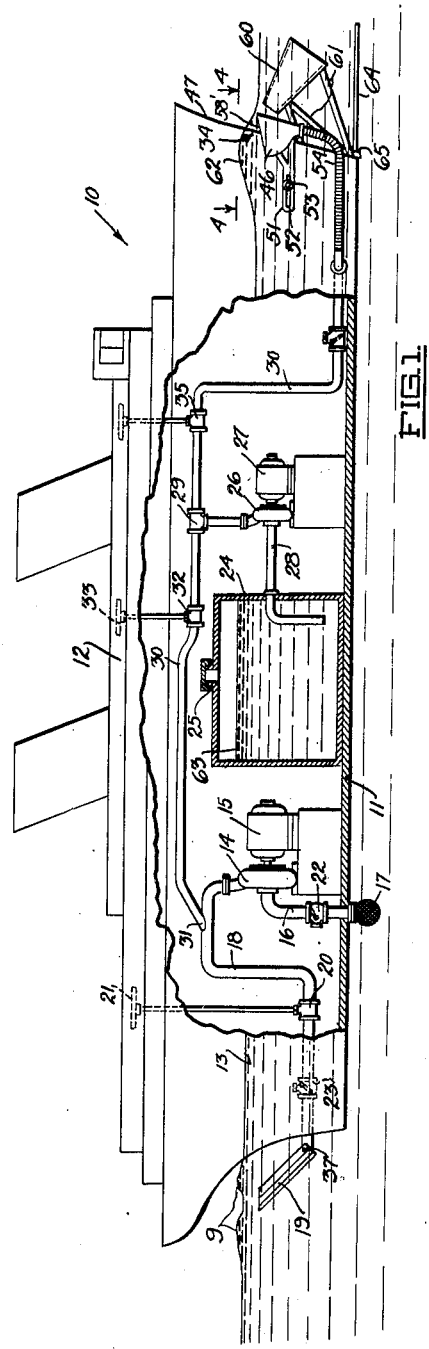
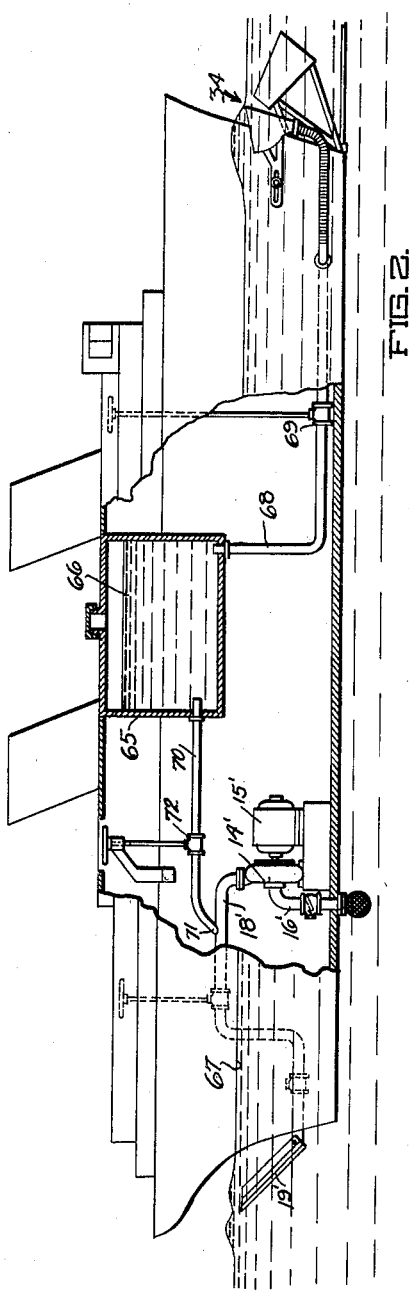
INVENTOR
BYRON C. HASKIN
BY W. A. Beatty
ATTORNEY July 4, 1939.  B. C. HASKIN  2,164,651
MINIATURE SHIP
Filed Jan. 25, 1938   3 Sheets-Sheet 2

INVENTOR
BYRON C. HASKIN
BY W. E. Beatty
ATTORNEY

July 4, 1939.  B. C. HASKIN  2,164,651
MINIATURE SHIP
Filed Jan. 25, 1938   3 Sheets-Sheet 3
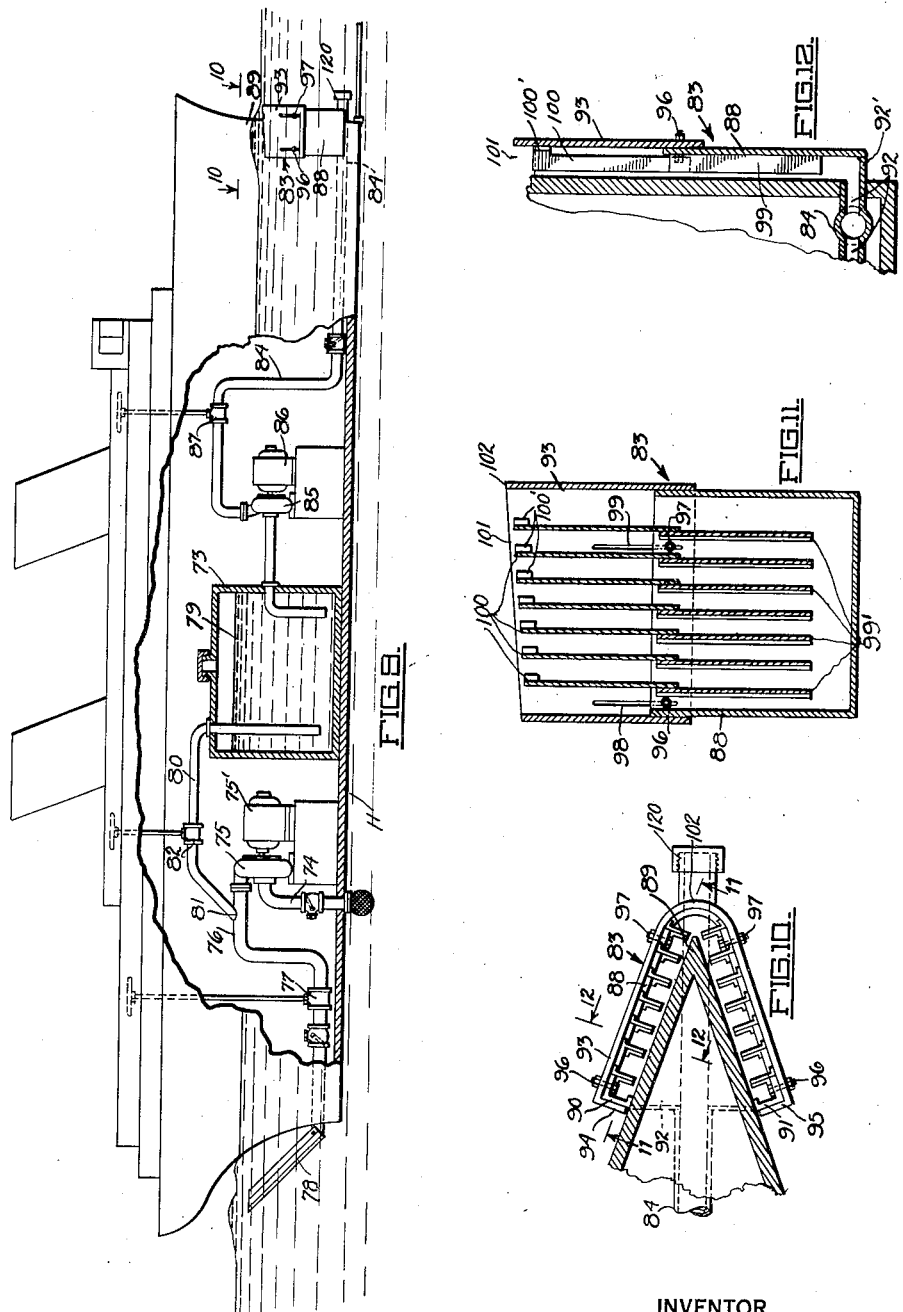
INVENTOR
BYRON C. HASKIN
BY W. E. Beatty
ATTORNEY Patented July 4, 1939

2,164,651

UNITED STATES PATENT OFFICE 2,164,651

MINIATURE SHIP

Byron C. Haskin, Beverly Hills, Calif., assignor to Warner Bros. Pictures, Inc., New York, N. Y., a corporation of Delaware Application January 25, 1938, Serial No. 186,837

15 Claims. (Cl. 272—26)

This invention relates to a miniature ship, or other water craft, and to method and apparatus for operating the same and has for an object to create artificial waves at the bow and/or stern of the miniature to simulate actual travel of a full sized craft through water.

As is well known, a full sized ship while travelling at moderate or high speed creates a peculiar wave motion on the water. That is, a bow wave is produced at the bow of the ship due to the entry and spreading action of the leading edge thereof while a stern wave, due in part to the propeller wash, is formed at the stern of the ship. Furthermore, the motion of the ship produces a wake made up largely of foam churned up by the propellers and by the skin friction of the hull of the ship while passing through the water.

When miniature ship models are moved through the water in a manner to simulate travel of full sized ships, such as for cinematographic purposes, these models produce waves or wake which are not of the proper size, shape or formation.

Usually the waves produced by the miniature are not of proper size in relation to the scale of the miniature, and if the miniature is towed at a very low speed, substantially no waves are produced. In other cases where the miniature is towed at a sufficiently high speed to produce a bow wave of the correct height, the wave will extend the entire length or more of the ship and therefore will not be of the proper shape due to the short length of the miniature, whereas in a full sized ship a bow wave usually does not extend more than one-third the length of the ship, and usually less. Also, the wake of the miniature will not be the proper size if the miniature is towed due to the absence of propeller wash, assuming that the miniature has no propeller. Also, generally spreaking, the waves making up the wake will be out of proportion and therefore not of proper size for the same reasons explained in connection with the bow wave. Also, both the bow wave and the wake of a miniature generally are not of proper formation due to the absence of foam and white spray which is produced by a full sized ship when travelling at normal speed.

A further object of the invention is to overcome the above defects, to the end that a motion picture of the miniature while moving through water may closely resemble a full sized ship under sail.

The manner in which the above and other objects of the invention are accomplished will be apparent from the following specification read in conjunction with the accompanying drawings wherein:

Fig. 1 is an elevational view of a miniature ship model, partly in section, embodying one form of the present invention.

Fig. 2 is an elevational view of a miniature ship model, partly in section, embodying another form of the invention.

Fig. 9 is an elevational view, partly in section, of a miniature ship model embodying still another form of the invention.

Fig. 10 is a sectional plan view of the bow of the miniature ship illustrated in Fig. 9 and is taken along the line 10—10 of that figure.

Fig. 11 is a sectional elevational view of the distributor illustrated in Fig. 10 and is taken along the line 11—11 of that figure.

Fig. 12 is a transverse sectional view of one side of the distributor illustrated in Fig. 10 and is taken along the line 12—12 of that figure.

Figure 3:
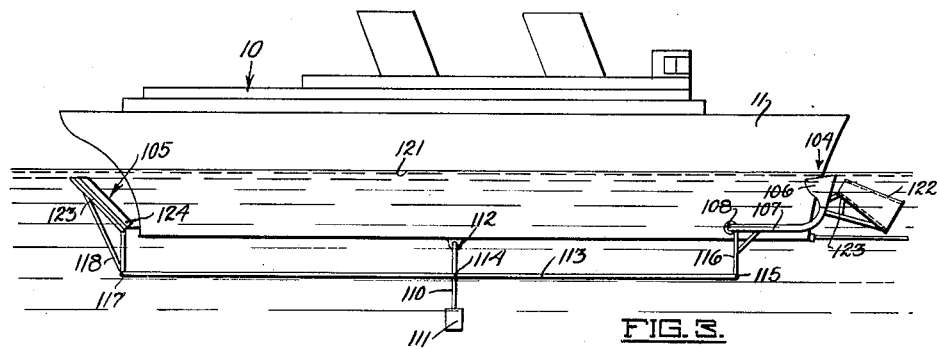
Fig. 3 is an elevational view of a miniature ship model illustrating a linkage assembly for retaining the wave forming devices at the same level while the boat is pitching.

Referring now to Fig. 1, the miniature ship model 10 illustrated therein comprises a hull 11 and a super structure 12 thereon. The super structure 12 is removably secured, preferably as a unit, to the deck of the hull 11 in a manner not shown to permit access to the interior thereof for adjustment or repair of the various mechanisms therein. The model 10 is shaped to form a counterpart of a full sized ship which it is to represent and is so ballasted that the water line 13 thereof is proportionately correct in height when the model is afloat.

A pump 14, preferably of the centrifugal type, is situated within the interior of the hull 11 and is driven by means of an electric motor 15. The inlet of the pump 14 is connected to an inlet pipe line 16 extending through the bottom of the hull 11 and opening downwardly thereat. A strainer 17 is fitted to the inlet opening of the pipe 16 to prevent foreign matter from being drawn through the pump. The outlet of pump 14 is connected to an outlet pipe line 18 extending rearwardly and opening rearwardly at the exterior of the stern of the model 10 below the water line 13 thereof. A deflector, generally indicated at 19, to be hereinafter described in detail, is attached to the outlet end of the pipe line 18 to deflect the stream of water passing through the line 18 upwardly toward the surface of the water to form waves 9 simulating the stern waves of a full sized ship. A valve 20, actuated by a control handle 21 accessible from the upper surface of the super structure 12 but hidden from view, is provided to regulate the flow of water through the line 18. Check valves 22 and 23 are provided in the pipe lines 16 and 18, respectively, to prevent drainage of the pump 14 when the motor 15 is stopped and thus obviate the necessity of priming the pump each time it is started. Motor 15 may be driven by current supplied either from storage batteries (not shown) concealed within the hull 11 or from a suitable source of current supply located exteriorly of the model 10 and connected to the motor 15 by a flexible submerged conduit (not shown).

A solution tank 24 containing a foam simulating solution is provided amidships and is situated at the bottom of the hull 11. A removable cap 25 at the top of the tank 24 permits the tank to be filled. A second pump 26, also preferably of the centrifugal type and driven by an electric motor 27, is supported in the hull 11. Pump 26 has the inlet thereof connected to an inlet pipe 28 extending into the tank 24. Motor 27 may be supplied with current in the same manner as the motor 15. Variable speed controls of the remote control type (not shown) such as rheostats provided in the motor circuits are preferably provided to regulate the speed of both the motor 15 and the motor 27 as desired. The outlet of the pump 26 is connected by a T coupling 29 to a solution supply pipe line 30 extending fore and aft of the model 10. The rearwardly extending portion of the pipe line 30 is connected to the water pipe 18 at 31 forming a Y connection to permit the injection of the solution from the tank 24 into the stream of water passing rearwardly through the pipe line 18. A valve 32, operated by means of a hand wheel 33 accessible from the upper surface of the superstructure 12, is provided to control the flow of solution into the pipe line 18. The forwardly extending end of the solution pipe line 30 is connected to a bow wave forming device, generally indicated at 34, to be described in detail hereinafter. A second valve 35 is connected to the line 30 intermediate the pump 26 and the wave forming device 34 to control the flow of solution to the device 34.

Figure 6:
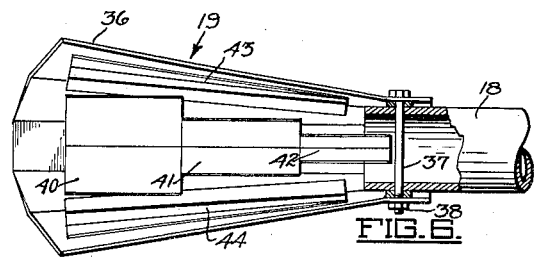
Fig. 6 is a plan view of the deflector forming part of a wave producing device for the stern of a miniature.
Figure 8:
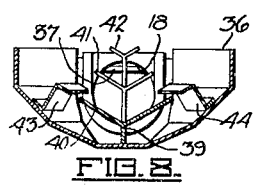
Fig. 8 is a transverse sectional view taken along the line 8—8 of Fig. 7.
Figure 7:
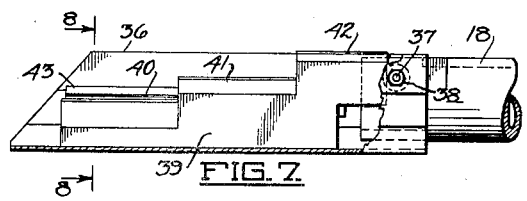
Fig. 7 is an elevational view, partly in section, of the deflector shown in Fig. 6.

The deflector 19, forming part of the stern wave and wake producing system, is shown in detail in Figs. 6 to 8, inclusive, and comprises a substantially U shaped shell 36 flaring outwardly from one end to the other thereof. The forward or smaller end of the shell 36 surrounds the open end of the outlet pipe 18 and is secured thereto by means of a horizontally extending bolt 37 passing transversely through the pipe 18 and both sides of the shell 36. By loosening the nut 38 of bolt 37 the shell 36 may be moved to any angular position about the horizontally extending bolt 37 and thence locked in that position. A longitudinally extending plate 39 lying in a vertical plane is secured along the center of the bottom of the shell 36 and supports three horizontally extending vanes 40, 41 and 42. Each of the vanes 40, 41 and 42 is V shaped in cross section, being secured at their apices to the upper edges of the plate 39. These vanes are spaced vertically so as to provide stepped fluid outlets permitting a distribution of the combined water and water coloring solution, emitted from the pipe 18, throughout an extended area. A pair of Z shaped vanes 43 and 44 are provided along either side of the shell 36 to assist in directing a portion of the stream emitted from the pipe 18 in a path parallel to the deflector 19. By varying the angular position of the deflector 19, the size, shape and other characteristics of the stern wave and wake may be changed as desired to suit the circumstances and conditions at hand.

Figures 4, 5:
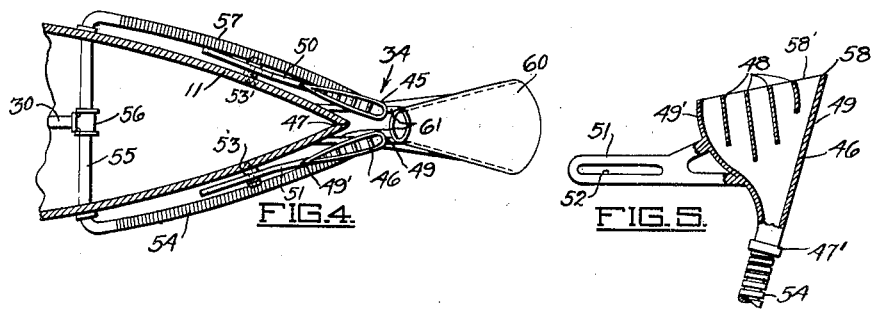
Fig. 4 is a sectional plan view of the bow of the miniature illustrated in Fig. 1 and is taken along the line 4—4 of that figure.
Fig. 5 is a sectional elevational view of one of the solution distributors illustrated in Fig. 4.

Referring now to Figs. 4 and 5 illustrating the bow wave forming device 34, this comprises a pair of fluid distributors 45 and 46 situated on either side of the leading edge 47 of the bow of hull 11. Each of these distributors is streamlined in horizontal cross section and extends substantially parallel to its respective adjacent side of the hull 11. In vertical cross section the leading and trailing edges 49 and 49', respectively, of each of the distributors diverge upwardly from an annular inlet opening 47'. A plurality of spaced substantially vertical transversely extending vanes 48 are situated adjacent the outlet of each distributor to form juxtaposed passages to distribute the solution passed therethrough evenly along the outlet opening of that distributor. The distributors 45 and 46 are secured to the bow of the ship through brackets 50 and 51, respectively. Each of these brackets is rigidly secured to its respective distributor and extends rearwardly. A longitudinally extending slot 52 is formed in each of the brackets 50 and 51 to receive a clamp bolt 53 threadably secured to the respective side of the hull 11. On loosening the respective bolt 53 the distributor and its bracket may be adjusted vertically and horizontally. The inlet 47' of the distributor 46 is connected by means of a flexible conduit 54 to one end of a transversely extending pipe 55 (Fig. 4). A T connection 56 in the pipe 55 connects the same with the forward extension of the solution supply line 30. The inlet of the distributor 45 is connected by means of a similar flexible conduit 57 to the opposite end of the pipe 55. The provision of the adjustable distributor supporting brackets 50 and 51 and the flexible conduits 54 and 57 leading to the distributors 45 and 46, respectively, permits the distributors to be adjusted in position to suit various conditions, such as the water line of the model 10. Preferably the distributors 45 and 46 are so positioned that the upper leading edge 58 of each is slightly below the level of the water in which the miniature ship model is suspended. However, in cases where large waves are produced on the surface of the water or where the ship is made to pitch a considerable amount, these nozzles are situated at a lower elevation to prevent them from being noticeable at any time. It will be noted on reference to Figs. 1 and 5 that the upper edge 58' of each distributor slants downwardly toward the rear thereof to permit the solution ejected by the distributor to be distributed at different heights or elevations instead of being distributed in a single stratum at the same height. A funnel shaped member 60 is supported directly in advance of the leading edge 47 of the bow by means of a framework 61. The small end of the member 60 is directed upwardly and is positioned adjacent the outlets of the distributors 45 and 46. As the miniature 10 is moved through the water the member 60 imparts a relatively high velocity to the stream of water passing therethrough and member 60 serves as a deflector in deflecting this stream in an upward direction, causing a bow wave 62 to form adjacent the leading edge 47. The framework 61 may be made adjustable in a manner not shown to permit the funnel member 60 to be changed in position whereby the size and shape of the bow wave 62 may be changed as desired. However, if the model is of sufficiently large size and the speed thereof is sufficiently great, and distributors 45 and 46 of sufficient size and correctly positioned relative to the leading edge 47 and the water level 13, the funnel 60 may be dispensed with, allowing the distributors 45 and 46 to create a bow wave themselves due to their projection in the water adjacent the bow.

When the solution pump 26 is in operation, the solution 63 within the tank 24 is pumped through the outlet opening of the two distributors 45 and 46 into the bow wave 62 formed by the funnel member 60. This solution is formed of a suitable white water coloring material, preferably miscible with water, and for this purpose I prefer to employ a mixture known as Poster's water color—show card white. This solution on entering the upwardly projecting stream of water forming the bow wave 62 colors the bow wave to simulate foam which would be produced by the skin friction and spreading action of the leading edge of a full sized ship as it cuts through the water.

The water coloring solution 63, on being injected into the pipe line 18 at 31 causes the stream of water emitted at the stern of the model by the pipe 18 to be colored, simulating the foam churned up by the propellers of a ship as well as by the turbulence effect of the ship passing through the water. The white colored wake left behind the ship by the coloring solution and the remaining bow and stern waves forms an exact semblance of the wake produced by a full sized ship and is especially effective in portraiting immensity of the model when cinematographed.

Any suitable means may be provided for moving the model 10 through the water while cinematographing or viewing the same. Preferably the model is towed by means of a submerged cable 64 attached to the bow at 65 below the water line of the model. However, the model may be propelled with the usual propellers driven by a power plant within the hull 11.

In operation, the speed of the motors 15 and 27 is so regulated and the valves 20 and 32 are so set that the fluid pressure in the after portion of the solution pipe line 30 is greater than the fluid pressure in the pipe line 18, thus preventing water drawn by the pump 14 from being pumped into the pipe line 30. Furthermore, the various valves 20, 32 and 35 are so adjusted and the speed of the motors 15 and 27 are so regulated that a proper amount of water coloring solution is emitted at the bow and stern. For cinematographic purposes the amount of solution emitted may be more or less than that required to produce satisfactory results when the moving model is viewed directly due to the difference in light sensitivity between cinematographic film and the eyes of an observer. Furthermore, the amount of coloring solution emitted into the bow and stern waves as well as the size and shape of the bow and stern waves may to a large extent serve as an indication of the relative size of the ship which the model is to portray since larger ships generally churn up more foam and produce bow and stern waves of different shape and size than small ships.

The above arrangement has been employed, using a model about 15 feet long and towing this model across a pond of about one hundred feet in diameter while cinematographing the model. It was discovered that the water coloring solution emitted at the bow and stern of the model to simulate foam, although noticeable during the cinematographing operation, later became so diluted by the water as to render it unnoticeable. This therefore permitted a subsequent cinematographing operation or retake shortly after the first operation while towing the model along the same path of movement without necessitating draining the water to remove the previously emitted coloring solution.

In lieu of the above mentioned water coloring solution I may employ an actual foam producing solution such as soap suds and the like to be injected into the bow and stern waves.

Fig. 2 illustrates another form of the invention wherein the solution pump 26 of Fig. 1 is dispensed with. In this case, a solution tank 65 containing a water coloring solution 66 is supported as far above the water level 67 of the model as possible, permitting a gravity feed of water coloring solution both fore and aft. The same type of bow wave forming device 34 is employed as in Fig. 1, there being a gravity feed pipe line 68 opening into the bottom of the tank 65 and connected to both distributors of the device 34 in the same manner as the pipe 30 (Fig. 4) is connected to the distributors 45 and 46. A valve 69 operable from the upper surface of the model is provided to control the flow of solution through the line 68. The means for ejecting water at the stern of the model is similar to that shown in Fig. 1 comprising an inlet pipe 16', a centrifugal pump 14' driven by a motor 15', an outlet line 18' and a deflector 19'. However, the solution from the tank 65 is fed to the outlet line 18' through a gravity feed line 70 opening into the bottom of tank 65 and forming a Y connection at 71 with the line 18. A valve 72 in the pipe line 70 permits control of the flow of solution therethrough. This type of construction is applicable in cases where the weight of the solution tank 65 and the solution 66 contained therein is insufficient to create an unstable condition in the model ship due to the position of the tank 65 above the center of gravity of the model.

Fig. 9 illustrates still another form of the invention wherein the solution tank 73 is placed adjacent the bottom of the hull 11. A stream of water is ejected at the stern of the hull 11 to simulate the stern wave and wake through apparatus similar to that illustrated in Figs. 1 and 2 and comprises, in series, an inlet pipe 74 having a downwardly extending opening below the bottom of the hull 11, a centrifugal pump 75 driven by an electric motor 75', an outlet pipe line 76, a valve 77, and a deflector 78, similar to that illustrated in Figs. 6 to 8, inclusive. The solution 79 from the solution tank 73 is injected into the pipe line 76 through a suction line 80. A valve 82 is provided to control the flow of solution through the line 80. It will be noted that the speed of motor 75' is so regulated and the valves 77 and 82 so adjusted that the back pressure in the outlet line 76 is sufficiently small and the velocity of the water pumped therethrough is sufficient to suck the solution 79 from the tank 73, through the solution line 80 and into the water outlet line 76 through a Y connection 81.

A solution distributing device generally indicated at 83, is provided at the bow of the hull 11 of the model and is fed by means of a solution pipe line 84. Solution 79 is drawn by means of a centrifugal pump 85, driven by an electric motor 86, from the tank 73 and forced through the pipe line 84. The pipe line 84 extends forwardly of the leading edge of the model and terminates in a closure cap 120 which is removable to permit cleaning of the line 84 and device 83. A valve 87 controls the flow of solution through the line 84. As shown in Figs. 10 to 12 inclusive, the solution distributing device 83 comprises a V shaped lower casing 88 enclosing the forward lower portion of the bow 89 of the model and spaced therefrom. The casing 88 is supported from the bow 89 by inwardly extending flanges 90 and 91 at the ends of casing 88 which are suitably secured, as by welding, to the sides of the bow 89, thus forming a V shaped vertically extending conduit. A horizontally extending conduit 92 (Figs. 10 and 12) communicates the solution pipe line 84 with the vertical conduit formed by the casing 88 on either side of the bow 89. The bottom wall 92' of the conduit 92 extends beyond either side of the bow 89 and is integrally united with the lower edge of the casing 88 to form a bottom enclosure for the conduit formed by the casing 88 and the sides of the bow 89. A second V shaped casing 93 is slidably fitted over the upper end of casing 88 to form a vertically extensible manifold. Inwardly extending flanges 94 and 95 at the ends of the casing 93 slide over the flanges 90 and 91, respectively, of casing 88 to form a coextensive conduit. A pair of bolts 96 and 97 pass through each side of the casing 88 and extend through vertical slots 98 and 99, respectively, formed in the respective side of the upper casing 93 to secure the upper casing 93 in position. A plurality of spaced vertical vanes 99' are suitably secured to each leg or side of the lower casing 88 in sliding relation with a plurality of spaced vertically extending vanes 100 secured to the upper casing 93 to form a series of juxtaposed passages whereby the water coloring solution fed by the pipe 84 may be evenly distributed along the length of the upper opening 101 on each side of the casing 93. It will be noted in Figs. 11 and 12 that each of the vanes 100 is secured only at the upper portion 100' thereof to the inner side of the casing 93, thus permitting the depending portion thereof to slide over the wall of casing 88. By loosening the bolts 96 and 97 on each side of the casing 88, the upper casing 93 may be adjusted in position vertically to accommodate for various water levels of the model. Preferably the upper and leading edge 102 of the casing 93 is situated just below the water level. In this position the projection formed by the casing 93 may be sufficient in itself to produce a bow wave as the model 10 is drawn through the water. However, in the event that this projection is insufficient in itself to produce a bow wave proportional in size and shape to the size of the model, an inverted frustoconical member similar to that of 68 (Fig. 4) may be added to deflect a stream of water upwardly at the bow.

Fig. 3 illustrates a linkage mechanism for retaining a bow wave forming device 104 and a stern wave or wake forming device 105 at substantially the same level relative to the water level 121 while the model 10 pitches either due to waves on the surface of the water or to an intentional artificial pitching movement imparted to the model as by invisible wires (not shown) manipulated by an operator. The bow wave forming device 104, in this case, is similar to that of 34 illustrated in Figs. 4 and 5. However, the distributors, one of which is shown at 106, are supported on rigid tubes 107 pivotally mounted at 108 on opposite sides of the hull 11 for movement about a transverse horizontal axis. Tubes 107 are supplied with solution in any suitable manner such as shown in Figs. 1 and 4 to feed the distributors 106. An inverted funnel member 122 is supported by either or both of the distributors 106 through framework 123 to create a bow wave.

A rod 110 supporting a weight 111 at its lower end is pivotally suspended amidships at 112 from the bottom of the hull 11, preferably half way between the bow and stern of the ship. A longitudinally extending link 113 is pivotally secured at 114, intermediate its ends, to an intermediate point on the rod 110 and is pivotally secured at the forward end thereof at 115 to a depending bracket 116 rigidly secured to the tubings 107 of the distributors 106. The rear end of the link 113 is pivotally secured at 117 to a depending bracket 118 rigidly secured to the deflector 123 of the stern wave forming device 105. Deflector 123 is pivotally mounted at 124 and is similar to that shown in Figs. 6 to 8, inclusive. It will thus be seen that the distributors 106 and the deflector 123 at the bow and stern, respectively, of the hull 11, are connected together and to the weight 111 through the substantially parallel link connection formed by the link 113 and pivotal connections 108 and 124 of the distributors 106 and deflector 123, respectively. Thus it will be seen that since the model 10 generally pitches about a transverse axis passing substantially midway therethrough, the upper edges of members 106 and 123 will remain at substantially the same elevation relative to the mean water lever 121 while the ship pitches longitudinally.

I claim:

1. Apparatus for simulating waves formed by a full sized ship travelling through a body of water comprising a miniature ship, and means carried by said miniature for artificially deflecting a stream of water upwardly adjacent said miniature from below the level of said body of water to form a wave when said miniature is moved through the water.

2. Apparatus according to claim 1 comprising means for injecting foam simulating matter into said stream.

3. Apparatus for simulating a wake at the stern of a miniature ship comprising the combination of means on said ship for ejecting a stream of water at the stern thereof and below the water line thereof, means at said stern for directing said stream upwardly to form an artificial wave, and means for ejecting colored matter into said stream.

4. Apparatus for simulating a wake at the stern of a miniature ship comprising the combination of a conduit on said ship having a water inlet below the water line of said ship and a water outlet at the stern of said ship and opening rearwardly thereof, and means for pumping a stream of water through said conduit at a speed sufficient to create an artificial stern wave.

5. Apparatus according to claim 4 comprising means on said ship below the water line thereof and adjacent said water outlet for deflecting said stream upwardly.

6. Apparatus for creating an artificial bow wave at the bow of a miniature ship comprising a distributor on said bow below the water line of said ship, said distributor having a plurality of substantially vertically extending passages therein arranged in a row extending substantially parallel with the sides of the bow of said ship, and means for passing foam simulating matter through said openings.

7. Apparatus for creating an artificial bow wave at the bow of a miniature ship comprising a manifold on said bow below the water line of said ship, an extension on said manifold and extending upwardly therefrom, means whereby said extension is vertically adjustable, said manifold and extension having co-extensive passages therein, said passages having outlets at the upper end of said extension, and means for supplying foam simulating matter into said manifold.

8. Apparatus for creating an artificial wave adjacent the end of a miniature ship to simulate a wave created by a full sized ship while travelling through water comprising a deflector on said ship, said deflector being situated below the water line of said ship and adapted to deflect a stream of water upwardly to create said wave.

9. Apparatus in accordance with claim 8 wherein said deflector comprises means for increasing the velocity of said stream.

10. Apparatus for creating an artificial bow wave at the bow of a miniature ship comprising a frustoconical funnel below the water line, means for supporting said funnel on said ship in advance of said bow, the small end of said funnel being elevated and adjacent said bow to deflect a stream of water upwardly on said bow.

11. Wave producing apparatus for a miniature ship comprising the combination of a wave forming device, means for movably supporting said device on said ship, a weight depending from said ship, and a link connection between said weight and said device whereby said device is retained at substantially the same elevation relative to the water level when said ship pitches.

12. Wave producing apparatus for a miniature ship comprising the combination of a wave forming device, means on said ship for movably supporting said device adjacent the bow thereof, a second wave forming device, means on said ship for movably supporting said second device adjacent the stern thereof, a weight depending from said ship, and linkage connections between said weight and said devices for maintaining said devices at substantially the same elevation relative to the water level when said ship pitches.

13. Apparatus for creating a wave at the bow and stern of a miniature ship supported by water comprising a fluid deflector movably carried by said ship adjacent the bow thereof, a second fluid deflector movably carried by said ship adjacent the stern thereof, a weight, a pivotal connection between said weight and said ship for suspending said weight below said ship and a link connection between said weight and said deflectors for automatically maintaining said deflectors at substantially the same distance below the water level when said ship pitches.

14. Apparatus for forming artificial waves at the bow and stern of a miniature ship comprising an artificial wave forming device, means for pivotally supporting said device at the bow of said ship for movement in a substantially vertical direction, a second artificial wave forming device, means for pivotally supporting said second device at the stern of said ship for movement in a substantially vertical direction, a weight, means for pivotally suspending said weight below said ship and a link connection between said weight and said devices.

15. Apparatus according to claim 10 wherein the large end of said funnel is open to the water on which said miniature floats.

BYRON C. HASKIN.